Patented Sept. 3, 1929.

1,726,671

UNITED STATES PATENT OFFICE.

FRANZ KURATH, OF CHICAGO, ILLINOIS, ASSIGNOR TO ECONOMY FUSE AND MANUFACTURING COMPANY, OF CHICAGO, ILLINOIS, A CORPORATION OF NEW YORK.

METHOD OF PRODUCING PHENOLIC CONDENSATION PRODUCTS.

No Drawing.   Application filed February 19, 1926.  Serial No. 89,438.

The present invention relates to improvements in methods of producing phenolic condensation products.

As is well known, potentially reactive phenolic condensation products may be prepared according to two processes, which are commonly referred to as one step reaction and two step reactions. Both of these processes as heretofore carried out have been subject to certain criticisms. According to the one step reaction as heretofore used, it is extremely difficult to free the potentially reactive intermediate product from water without obtaining a rubbery, insoluble and infusible product having no commercial utility.

The present invention relates more particularly to what is known as the one step reaction, wherein methylene containing substances are treated with a phenolic substance in the presence of a condensing agent until separation into two layers occurs and until the resinous layer has acquired the desired consistency.

An object of the present invention is to provide a process whereby the loss of formaldehyde may be reduced to a minimum.

A further object is to provide a process whereby the supernatant layer of the two layers referred to may be readily removed without endangering the excellence of the product.

A further object is to provide a process involving the one step reaction which will reduce the cost from prior practice.

Further objects will appear as the description proceeds.

In explaining the present invention, the method of producing phenolic condensation products may be briefly referred to. In the preparation of such products, a phenolic body and a reactive methylene group containing substance, such as formaldehyde, are boiled under a reflux condenser in the presence of furfuramide, which furfuramide may amount to approximately 10 per cent by weight of the phenolic substance. It is to be understood that though furfuramide is preferred at this stage of the proceedings, the invention also contemplates the use of any other condensing agent, either basic, acid, or neutral, or is applicable in the absence of a condensing agent at this stage. The proportions of phenolic body and the reactive methylene group containing substance chosen should be such that upon continued heating an infusible, insoluble body will result. These proportions are well known in the art and are approximately equimolecular. The boiling treatment may continue until separation into two layers occurs and until the resinous layer has acquired the desired consistency. The reaction is then stopped, by cooling, if necessary, or by diluting with water.

After the reaction as above referred to has been stopped, additional furfuramide is stirred into the mixture. Sufficient furfuramide is added to cause the odor of formaldehyde to disappear from the supernatant water. An excess of furfuramide may be added, if preferred. Usually 15 to 25 per cent of furfuramide, reckoned on the phenolic body, is sufficient. Determination of the exact amount of uncombined formaldehyde present in the supernatant liquid is unnecessary, since it is only necessary to add an excess of furfuramide, the excess furfuramide having no deleterious effect. The exact nature of the reaction which occurs upon the addition of furfuramide is not known to applicant at present, but the result of the addition of furfuramide is the retention within the resinous layer of the reactive methylene groups in a non-volatile and reactive form. The supernatant water may then be decanted without loss of formaldehyde, and a potentially reactive resin is had which contains only a small amount of water and which contains sufficient reactive methylene groups to form an infusible product upon heating. There is no danger of obtaining a rubbery, worthless product, which danger has been present in the one step process as heretofore practiced. Any small amounts of water still present in the resin may be removed by heating for a short time at temperatures below that at which hardening occurs, though, for the most purposes, a small amount of water at this stage is not harmful.

The potentially reactive resin so obtained is adapted for any of the uses to which such products are ordinarily put, and is especially adapted for mixture with fillers and molding into infusible and insoluble articles by the combined action of heat and pressure. Molded articles made from the resin produced by the above improved process possesses high electrical and chemical resistance and do not blister when subjected to high temperatures. Furthermore, molding composition including this process flows well in the mold, and hardens very rapidly, due to the fact that the furfuramide acts as a plasticizing agent and as a condensing agent.

It will be noted that condensing agents other than furfuramide may be used in the initial reaction previous to the addition of the furfuramide, which serves to remove the formaldehyde in the supernatant aqueous layer. For example, sodium hydroxide, or an acid such as oxalic acid, may be used, or a neutral condensing agent may be used, or a condensing agent may be omitted entirely in said initial reaction. In the event that an acid is used in said initial reaction, it is desirable to neutralize said acid before the addition of the furfuramide, for the reason that the presence of an acid tends to develop a dark color in the final product.

In any case, it is necessary to have sufficient reactive methylene group containing substance present to combine with all of the phenolic body, since if there should be a deficiency of reactive methylene group containing substance, some of the furfuramide would enter into combination with the phenolic body during the conversion of the intermediate product into the final product, resulting in a substance containing free ammonia, which would, of course, be undesirable.

Though in the above description the term "furfuramide" has been used, it will occur to those skilled in the art that it is possible to use hydrobenzamide, which, though differing in chemical structure from furfuramide, has very many of the characteristics of furfuramide. In the claims which accompany this specification the term "furfuramide" is to be given a broad interpretation to include equivalents thereof, such as hydrobenzamide.

The present invention has the advantage that very cheap homologous phenols, such as the mixture of isomeric xylenols (known in the market as cresylic acid), may be utilized.

It is intended in this case to cover all modifications which fall within the scope of the appended claims.

What is claimed is—

1. The method of treating the resultant fusible substance accruing from the reaction of a reactive methylene group containing substance and a phenolic substance, the methylene group containing substance being present in sufficient quantity so that an infusible product would result upon heating, which consists in adding furfuramide thereto in sufficient quantity to fix within the resinous layer the reactive methylene group containing substance in a substantially non-volatile and reactive form.

2. The process which consists in producing a mixture of a reactive methylene containing substance, phenol and furfuramide, said reactive methylene containing substance being present in sufficient quantity so that an infusible product will result upon heating, and then heat treating said mixture.

3. The process which consists in producing a mixture of a reactive methylene containing substance, phenol and furfuramide, said reactive methylene containing substance being present in sufficient quantity so that an infusible product will result upon heating, heat treating said mixture until separation into two layers occurs and then mechanically discarding the supernatant layer.

4. The method of treating the resultant fusible substance accruing from the reaction of formaldehyde and a phenolic substance, the formaldehyde being present in sufficient quantity so that an infusible product would result upon continued heating, which consists in adding furfuramide thereto in sufficient quantity to eliminate the odor of formaldehyde.

5. The process which consists in producing a mixture of formaldehyde, phenol and furfuramide, said formaldehyde being present in sufficient quantity so that an infusible product will result upon heating, and then heat treating said mixture.

6. The process which consists in producing a mixture of formaldehyde, phenol and furfuramide, said formaldehyde being present in sufficient quantity so that an infusible product will result upon heating, heat treating said mixture until separation into two layers occurs and then mechanically discarding the supernatant layer.

7. In a one-step reaction of the character described, employing methylene groups as a hardening agent, the process which consists in producing the initial condensation product and supernatant layer, carrying the reactive methylene groups from the supernatant layer into the resinous layer in a substantially non-volatile reactive form by the action of furfuramide and then mechanically discarding the supernatant layer.

8. The method of retaining the reactive methylene groups in the one-step condensation reaction described, which consists in causing furfuramide to be present after the supernatant layer is formed by the initial reaction.

9. In a one-step process for producing a condensation product from phenol and a methylene containing substance, the method of fixing the reactive methylene groups in the resinous layer in a substantially non-volatile reactive form by the action of furfuramide.

10. In a one-step reaction of the character described, employing methylene groups as a hardening agent, the process which consists in producing the initial condensation product and supernatant layer, removing the reactive methylene groups from said supernatant layer and fixing said reactive methylene groups in the resinous layer in a substantially non-volatile reactive form and then mechanically discarding the supernatant layer.

Signed at Chicago, Illinois, this 8th day of February, 1926.

FRANZ KURATH.